United States Patent
Tartakovsky et al.

(10) Patent No.: US 10,981,817 B2
(45) Date of Patent: Apr. 20, 2021

(54) WASTEWATER TREATMENT WITH IN-FILM MICROBIAL HEATING

(71) Applicant: NATIONAL RESEARCH COUNCIL OF CANADA, Ottawa (CA)

(72) Inventors: Boris Tartakovsky, Cote St. Luc (CA); Yehuda Kleiner, Thornhill (CA)

(73) Assignee: National Research Council of Canada, Ottawa (CA)

( * ) Notice: Subject to any disclaimer, the term of this patent is extended or adjusted under 35 U.S.C. 154(b) by 43 days.

(21) Appl. No.: 15/875,511

(22) Filed: Jan. 19, 2018

(65) Prior Publication Data
US 2019/0225518 A1    Jul. 25, 2019

(51) Int. Cl.
*C02F 3/30* (2006.01)
*C02F 3/34* (2006.01)
(Continued)

(52) U.S. Cl.
CPC .............. *C02F 3/301* (2013.01); *C02F 3/005* (2013.01); *C02F 3/348* (2013.01); *C02F 11/04* (2013.01);
(Continued)

(58) Field of Classification Search
CPC .......... C02F 3/301; C02F 3/005; C02F 3/348; C02F 2103/005; C02F 2103/32; C02F 2209/22; C02F 2209/28; C02F 11/04
(Continued)

(56) References Cited

U.S. PATENT DOCUMENTS

| 3,783,114 A | 1/1974 | Ishii et al. |
| 4,983,265 A | 1/1991 | Maruyama |

(Continued)

FOREIGN PATENT DOCUMENTS

| AU | 2013/299508 A1 | 2/2014 |
| CA | 2542894 A1 | 10/2007 |

(Continued)

OTHER PUBLICATIONS

Villano, M. et al. (2010), Bioelectrochemical reduction of CO2 to CH4 via direct and indirect extracellular electron transfer by a hydrogenophilic methanogenic culture. Bioresource Technology, 101, pp. 3085-3090.

(Continued)

*Primary Examiner* — Nam X Nguyen
*Assistant Examiner* — Julia L. Wun
(74) *Attorney, Agent, or Firm* — Nassima Naas (57) ABSTRACT

A technique for wastewater treatment involves ensuring that all paths for wastewater must pass through at least one porous microbial support to go from the inlet to the outlet, and allowing a biofilm to grow on the porous microbial support under microaerobic conditions (concentration of oxygen between 0.05 and 0.35 mg/L). The biofilm formed comprises a population of anaerobic microbes for digesting organics in the wastewater including methanogenic microbes, and an aerobic methanotrophic and heterotrophic population that catabolizes methane from the methanogenic microbes, and oxygen from the injector, to produce heat. The support may be an electrode, and the technique is applied in a microbial electrolysis cell, with substantial COD removal rates.

19 Claims, 1 Drawing Sheet (51) Int. Cl.
*C02F 11/04* (2006.01)
*C02F 3/10* (2006.01)
*C02F 101/16* (2006.01)
*C02F 101/10* (2006.01)
*C02F 101/30* (2006.01)
*C02F 3/00* (2006.01)
*C02F 103/00* (2006.01)
*C02F 103/32* (2006.01)

(52) U.S. Cl.
CPC .......... *C02F 3/10* (2013.01); *C02F 2101/101* (2013.01); *C02F 2101/16* (2013.01); *C02F 2101/30* (2013.01); *C02F 2103/005* (2013.01); *C02F 2103/32* (2013.01); *C02F 2209/22* (2013.01); *C02F 2209/28* (2013.01)

(58) Field of Classification Search
USPC ... 210/605, 739, 748.01, 615, 903, 908, 916
See application file for complete search history.

(56) References Cited

U.S. PATENT DOCUMENTS

| | | | |
|---|---|---|---|
| 5,599,451 A * | 2/1997 | Guiot | C02F 3/085 |
| | | | 210/150 |
| 5,853,579 A | 12/1998 | Rummler et al. | |
| 6,015,496 A | 1/2000 | Khudenko | |
| 6,156,192 A | 12/2000 | Rummler | |
| 6,238,546 B1 | 5/2001 | Knieper et al. | |
| 7,682,815 B2 | 3/2010 | Guiot et al. | |
| 8,147,700 B2 * | 4/2012 | Elektorowicz | C02F 1/463 |
| | | | 210/243 |
| 8,323,474 B2 | 12/2012 | Jeon | |
| 8,894,856 B2 | 11/2014 | Liu et al. | |
| 8,974,669 B2 | 3/2015 | Del Porto | |
| 9,011,681 B2 | 4/2015 | Hawks | |
| 9,216,919 B2 | 12/2015 | Popat et al. | |
| 9,771,281 B2 * | 9/2017 | Ibeid | C02F 1/4672 |
| 9,776,897 B2 * | 10/2017 | Silver | C02F 3/005 |
| 2011/0315561 A1 | 12/2011 | Rabaey et al. | |
| 2012/0003504 A1 | 1/2012 | Yamazawa et al. | |
| 2012/0100590 A1 | 4/2012 | Tartakovsky et al. | |
| 2013/0112601 A1 * | 5/2013 | Silver | C02F 3/025 |
| | | | 210/143 |
| 2013/0277231 A1 | 10/2013 | Greenberg | |
| 2013/0299400 A1 * | 11/2013 | Silver | C02F 3/005 |
| | | | 210/150 |
| 2013/0306565 A1 | 11/2013 | Davis | |
| 2014/0001120 A1 | 1/2014 | Jowett et al. | |
| 2015/0064501 A1 | 3/2015 | Ren et al. | |
| 2015/0210575 A1 | 7/2015 | Silver et al. | |
| 2016/0190627 A1 * | 6/2016 | Danzer | H01M 8/16 |
| | | | 210/601 |
| 2016/0326031 A1 | 11/2016 | Amy et al. | |

FOREIGN PATENT DOCUMENTS

| | | |
|---|---|---|
| EP | 2630088 B1 | 8/2013 |
| EP | 2976421 B1 | 1/2016 |
| WO | 2010142004 A2 | 12/2010 |
| WO | 2014082989 A1 | 6/2014 |
| WO | 2014/0172791 A1 | 10/2014 |

OTHER PUBLICATIONS

Stephenson, R. J. et al. (1999), Effects of oxygenation and upflow liquid velocity on a coupled anaerobic/aerobic reactor system. Wat. Res., vol. 33, No. 12, pp. 2855-2863.
Tartakovsky, B. et al. (2005), Degradation of trichloroethylene in a coupled anaerobic-aerobic bioreactor modeling and experiment. Biochemical Engineering Journal 26, pp. 72-81.
Guiot S.R. et al. (1993), Coupled aerobic and anaerobic treatment of toxic wastewater. Paper presented at 7th forum for Applied Biotechnology, Universiteit Gent, pp. 1761-1770.
Van Bodegom, P. et al. (2001), Methane Oxidation and the Competition for Oxygen in the Rice Rhizosphere. Appl. and Environ. Microbiol., pp. 3586-3597.
Heidrich, E S. et al. (2011), Determination of the Internal Chemical Energy of Wastewater. Environ. Sci. Technol., 45, pp. 827-832.
Tartakovsky, B. et al. (2017), Bioelectrochemical Anaerobic Sewage Treatment Technology for Arctic Communities. Environ. Sci. Pollut. Res., 7 pages.
Hussain, S. A. et al. (2018), Real-Time Monitoring of a Microbial Electrolysis Cell Using an Electrical Equivalent Circuit Model. Bioprocess and Biosystems Engineering, 41, pp. 543-553.
Johansen, J.-E. et al. (2006), Enhancing hydrolysis with microaeration. Wat. Sci. & Technol. vol. 53, No. 8, pp. 43-50.
Rohner, T. (2016), Water and wastewater treatment challenges in Canada's North. 7 pages.
Frost & Sullivan (2015), Energy Positive Wastewater Treatment. Futuretech (TechVision), 18 pages.
English Machine Translation of Chinese Application No. 103435159A.
English Machine Translation of Chinese Application No. 106957134A.
English Machine Translation of Spanish Application No. 2539416.
English Machine Translation of Korean Application No. 101367711.
English Machine Translation of Chinese Application No. 101549897A.
Yang Deng et al., Advanced Oxidation Processes (AOPs) in Wastewater Treatment, Curr Pollution Rep (2015) 1:167-176.
Chuanping Feng etal., Water disinfection by electrochemical treatment, Bioresource Technology, 94 (2004) 21-25.
H. Cheng et al., Intensification of Water Electrolysis in a Centrifugal Field, Journal of the Electrochemical Society, (11) D172-D177 (2002).

* cited by examiner

WASTEWATER TREATMENT WITH IN-FILM MICROBIAL HEATING

FIELD OF THE INVENTION

The present invention relates in general to enhancing wastewater treatment and, in particular, to a gravitational flow wastewater treatment method and apparatus, principally operating as an anaerobic digester, but also introducing a controlled small amount of oxygen to support a population of methanotrophs for catabolising methane.

BACKGROUND OF THE INVENTION

Healthy environments require efficient removal of organic materials from domestic, municipal, and food processing wastewaters. As such wastewater discharge standards are defined for treatment. While the term wastewater may elsewhere broadly denote any water supply that is polluted, or contaminated by human activity, the term herein refers only to the processing of removal of a broad class of organic materials in sewage expected from domestic, municipal, and food processing environments, and the remediation of these to relevant standards. Special purpose reactors for remediating very particular metals, toxins, and compounds such as highly chlorinated compounds, that might be expected in mining tailings, industrial chemical processing, and other specific toxic remediation processes, are subject to distinct remediation standards and processes and are not intended to be included by the term "wastewater" herein.

Different wastewater treatment (WWT) systems are used, depending on volume and concentration of the wastewater supply; variability of the volume and concentration; and energy and spatial constraints. One special concern in some climates and seasons, is temperature: in polar regions, continuous heat supply may be required for processing Speaking in generalities: Anaerobic WWT systems are used to treat higher concentration wastewaters (including sludge from aerobic WWT systems). Where the sludge is of sufficient strength (e.g. above 2 g/L COD or 1 g/L BOD), effort is typically expended in anaerobic WWT systems to harvest biogas. Anaerobic degradation requires long retention times (typically 20-30 days); is sensitive to abrupt changes in temperature and incoming sewage composition; and requires continuous management by trained personnel. Even relatively small fluctuations in the influent stream properties can lead to anaerobic digestion failure, requiring remediation. Furthermore, the effluent of anaerobic digesters often requires aerobic polishing to satisfy wastewater treatment standards.

A comprehensive WWT system, including sludge treatment, is a viable option for larger cities where many residents contribute, but is not possible in small communities, or on vessels such as ships equipped with latrines. There is a need for wastewater treatment systems that: require less maintenance and use lower power equipment; reduce sludge production; and produce reliable assurance of discharge standards with minimal involvement from skilled personnel with low retention times.

Furthermore, heat is known to play an important role in both anaerobic and aerobic processes. In some climates and seasons, heat is required to be continuously supplied throughout wastewater treatment. As a general rule of thumb, the $Q_{10}$ principle is that a rate of most biological processes increases by a factor of 2-3 for an increase of 10° C. To maintain acceptable biodegradation rates, aerobic (activated sludge) WWT systems operate at or above 10° C. with a preferred temperature range of 20-25° C. The preferred temperature of typical anaerobic digesters is substantially higher than activated sludge WWT systems. The typical anaerobic digesters are most efficient at 35-37° C. While operation of anaerobic digesters at temperatures of 5-15° C. (psychrophilic conditions) has been demonstrated, the required retention times are well in excess of 20 days.

U.S. Pat. No. 8,974,669 to Del Porto teaches a thermally enhanced integrated WWT system that uses waste heat from burning biogas for electricity generation. It is logical to salvage waste heat when burning biogas to produce electricity, given the thermodynamic limits on how much of the heat can be converted into electricity or work. It also makes sense to use the heat to enhance the biological treatment of the sewage in cold climates and/or in cold seasons. Unfortunately a practical solution is complicated by a difficulty of harnessing the waste heat efficiently and safely, and the co-operation of a generator with WWT plants lead to particular complexities. The patent does not offer a schematic drawing to show how to integrate such plants. It is generally desirable to keep conductive bodies, such as water, away from high voltage equipment of combustion-based electricity generation plants. Distancing the combustor from the WWT substantially impairs the promise of heat transfer. Distancing the burner from the electrical generator impairs generation of electricity for much the same reasons.

Whether or not a balance can be achieved between these trade-offs that is acceptable to both plant production concerns, the cost of equipment and management effort required for such plants are higher than would be desirable. Furthermore, heat exchangers required by U.S. Pat. No. 8,974,669 may be expensive, prone to clogging or breaking and leaking, which may be totally unacceptable to both the WWT process and the electricity generation processes.

Applicant disclosed in Environ Sci Pollut Res (http://doi.org/10.1007/s11356-017-8390-1, Tartakovsky et al.) a paper entitled: Bioelectrochemical Anaerobic Sewage Treatment Technology for Arctic Communities. This paper discloses a conventional septic tank modified with two porous microbial supports, separating the tank into a scum collector region, a sludge collector region, and a clarifier region. At least the support separating the sludge collector and clarifier regions is defined by an electrode pair separated by a geotextile (or another porous non-conductive material) coupled to a power source to simultaneously encourage anaerobic methanogenic and anaerobic microbial electrochemical (bioelectrochemical) degradation processes leading to biomethane production.

Bioelectrochemical technologies have been proposed for wastewater treatment. In microbial fuel cells (MFCs) electricity is directly produced from organic wastes. Organic matter is oxidized at the anode by anodophilic (electricigenic, exoelectrogenic) microorganisms, which use the anode as a terminal electron acceptor. In MFCs the cathode is exposed to air to facilitate oxygen reduction reaction (ORR), resulting in electricity production. In microbial electrolysis cells (MECs) biodegradation is accomplished by applying low voltage (below a practical threshold of 1.5-1.8 V for water electrolysis) to the electrodes. The anodic reaction in MECs is the same as in MFCs (electrogenic oxidation of organic materials), while at the anaerobic cathode, hydrogen is produced from electrons and protons. The presence of other microbial populations at the cathode such as hydrogenotrophic methanogens, results in hydrogen and carbon dioxide conversion to methane. Also, direct production of methane at MEC cathodes by the electrogenic (anodophilic) microorganisms has been demonstrated (Villano, M., F. Aulenta, C. Ciucci, T. Ferri, A. Giuliano, and M. Majone (2010), Bioelectrochemical reduction of $CO_2$ to $CH_4$ via direct and indirect extracellular electron transfer by a hydrogenophilic methanogenic culture, Bioresource Technol., 101, 3085-3090). In both systems, proton exchange membranes are used to restrict exchange of dissolved molecules and ions between the anode and cathode compartments, while enabling proton transport, although membraneless configurations are also known.

Existing MFC-based technologies feature extremely low volumetric power density and high capital costs. MEC-based wastewater treatment has so far only been demonstrated on high strength low variability wastewaters, which is hard to ensure in real wastewater treatment systems. Several companies are developing microbial electrochemical technologies (MEC and MFC). Patents for bioelectrochemical systems have been applied for, such as AU 2013/299508 Biological Treatment Systems Utilizing Selectively Permeable Barriers and EP 2,630,088 Bio-electrochemical Systems, by Cambrian Innovation Inc.

In a somewhat remote field of science, it has been observed that anaerobic and aerobic decomposition of certain liquors can be simultaneously observed, if dissolved oxygen content in a substantially anaerobic digester can be maintained above zero, but less than 0.5 mg/L, according to a "microaeration" regime (Johansen, J. E., Bakke, R., 2006. Enhancing hydrolysis with microaeration. Water Sci. Technol. 53(8), 43-50; Stephenson, R. J., Patoine, A., Guiot, S. R., 1999; Effects of oxygenation and upflow liquid velocity on a coupled anaerobic/aerobic reactor system. Wat. Res. 33, 2855-2863.)

Some polluted water treatment systems have used microaeration conditions to: treat specific pollutants, such as chlorinated compounds (Tartakovsky, B., M. F. Manuel, and S. R. Guiot (2006), Degradation of trichloroethylene in a coupled anaerobic-aerobic bioreactor: modeling and experiment, Biochemical Engineering Journal, 26(1), 72-81); or assist with organic material hydrolysis (Guiot, S. R., J. C. Frigon, B. Darrah, M. F. Landry, and H. Macarie (1993), Coupled aerobic and anaerobic treatment of toxic wastewater, paper presented at 7-th forum for Applied Biotechnology, University of Gent, Gent, Belgium). These treatment systems have naturally produced granular biofilms having a layered structure with methanogens on the support covered by a thin layer of methanotrophs and heterotrophes. The coexistence of these species in the microaerated medium allow for the very limited oxygen to be consumed by the thin layer of microbes with methane produced by the anaerobic methanogens. The shielding of the methanogens from the oxygen is essential to their survival. So while microaeration treatments of certain effluents are known, they have not been suggested for use in wastewater treatment or catabolic decomposition for in-film heating.

WO2014/0172791 to Streets et al. teaches a modified septic tank that contains a separate aerated film media support, and an air dispersal mechanism with a bed of air stones. The aerated media support is said to provide oxygen to promote growth of aerobic bacteria and to further remove organic contaminants from the wastewater. As such, more oxygen is introduced than necessary for the growth of bacteria, and "microaeration" is not derivable from this reference. Streets et al. does not explain how dissolved oxygen content is impeded from reaching all of the allegedly anaerobic regions of the reactor, given that flow rates are expected to be exceedingly low in such reactors, while providing high enough oxygenation to permit aerobic decomposition. Streets et al. appears to teach use of sensors for regulating air injection. Streets et al. teaches an aerobic biofilm and free floating anaerobic decomposition, but fails to teach or suggest biofilms of both aerobic and anaerobic colonies provided by microaeration.

EP 2,976,421 to Angelidaki et al., and many others, teach membrane-separated compartments for separating anode and cathode chambers in a wastewater pretreatment device for extracting specific anaerobic inhibitors from a wastewater. It specifically provides for the possibility of anaerobic microorganisms in the anode for converting energy released in metabolic reactions into electrical energy. However membrane-based reactors have a host of problems associated with them.

There remains a need for a WWT system that is substantially anaerobic, but has improved degradation performance where in-film heating is provided by catabolysis of methane made possible with microaerobic conditions.

SUMMARY OF THE INVENTION

Applicant has discovered conditions permitting in-film heating by catabolysis of methane in wastewater treatment reactors. The ability to supply heat, precisely where the heat is most necessary, offers the potential to reduce costs for wastewater treatment in cold climates and seasons.

By aerating wastewater to a very small degree (sufficient oxygen to be toxic for most anaerobic bacteria and to net positive thermal energy, such as at least 0.05 mg/L, but less than about 0.35 mg/L) a population of aerobic methanotrophic and heterotrophic microorganisms naturally forms as a protective cover over anaerobic microorganisms. This aerobic population scavenges all the oxygen, protecting the underlying methanogenic anaerobic microorganisms. As noted above, any anodophilic species of the biofilm would underlie the methanogenic microbes and a fortiori be protected from the oxygen. An abundance of methane is guaranteed by the anaerobic methanogenic microorganisms that are fed by the organic-rich wastewater. The presence of oxygen in the bulk liquid and the outer biofilm layer, allows the methanotrophic bacteria to effectively burn the methane to produce carbon dioxide and heat. This process takes place directly within the biofilm, and the carbon dioxide is therefore available to the anaerobic microorganisms that can grow and continue to purify the wastewater.

Removal of malodorous $H_2S$, and/or ammonia through microbially-catalyzed oxidation may be provided by the biofilm. No additional combustor or heat distribution mechanisms are needed. All that is required is the controlled supply of air or oxygen.

It should be noted that heat is also produced through the oxidation of organic materials by aerobic heterotrophic bacteria. However, at dissolved oxygen concentrations below 0.35 mg/L the aerobic heterotrophic activity is oxygen-limited. At the same time, certain methanotrophic bacteria (type II methanotrophs) are known to metabolize at extremely low oxygen concentrations, e.g. in anaerobic digesters, where oxygen is only provided by the influent wastewater stream (van Bodegom et al, Appl Environ Microbiol. 2001, 3586-3597). Thus the aerobic layer of the biofilm will further directly contribute to both in-film heating and COD removal to some degree.

Micro-aeration can be used to achieve "in-film" (internal) heating of the treatment system by catabolism. Indeed, aerobic degradation of organic materials is an exergonic reaction with a positive value of at least 4.083 Wh per g of COD degraded (7.6 kJ/L, Heidrich, E. S., Curtis, T. P., Dolfing, J., 2011. Determination of the Internal Chemical Energy of Wastewater. Env Sci Technol 45, 827-832) of Gibbs free energy (microbial combustion reaction). While in conventional aerobic degradation energy production is offset by heat losses due to high volumes of cold air provided for aeration, micro-aerobic conditions are achieved at low aeration rates (e.g. 1/20th to 1/5th of a typical aeration rate). For example, an aeration rate of 30-40 SLPM (43-58 m$^3$/day)—can be used to provide an oxygen concentration above 4 mg/L in an activated sludge system treating 0.5 to 0.6 m$^3$/day of wastewater, i.e. an air-to-liquid ratio of at least 70 is typically maintained. By contrast, a microaerobic system only requires an aeration to wastewater flow ratio of 3.5 to 14. Such low rates of aeration result in significantly lower heat losses, which in turn result in self-heating of the treatment system.

While typical anaerobic digesters generally have maximum efficiency at 35-37° C., anodophilic anaerobic microorganisms have been shown by Applicant to exhibit substantially equal performance at temperatures ranging from 5-25° C. with nearly constant COD degradation rates (Tartakovsky, B., Y. Kleiner, and M.-F. Manuel (2017), Bioelectrochemical Anaerobic Sewage Treatment Technology for Arctic Communities, *Environ Sci Pollut Res*, Jan. 20, 2017, http://doi.org/10.1007/s11356-017-8390-1). This reference was published within one year of the filing of the present invention and is considered not prior art for the present invention.

The possibility of lower temperature COD degradation is a breakthrough for cold climate WWT. Anodophilic COD degradation has important advantages for improved control over WWT system, and simplified supervision. An advantage of these two discoveries together is the use of anaerobic anodophilic COD degradation with lower temperature operation, that cooperate with the microaeration conditions to increase COD degradation in colder wastewaters. The WWT system may achieve wastewater treatment norms in a single reactor, that only uses gravitational flow for handling, with relatively low retention times. The WWT system may be energetically net positive due to biomethane production, and may work efficiently even at low temperatures.

Applicant has shown that micro-aeration of anode compartments does not impede anodic bioelectrochemical reactions in the biofilm. Microaeration of cathodic compartments are not expected to be inhibited by microaeration either. Under microaerobic conditions (hereinafter referring to bulk oxygen concentration below 0.35 mg/L, but above toxicity for unprotected anaerobic bacteria) an oxygen penetration depth of only 5-10 μm is expected due to fast oxygen consumption by methanotrophic and heterotrophic microorganisms. Anaerobic microorganisms in a mature biofilm with a depth of greater than about 10 μm are therefore protected from oxygen. This protection enables anodophilic activity at the electrode surface and methanogenic activity elsewhere in the biofilm.

Furthermore, as the volume of air for micro-aeration is small, heating the air may call for only a very small electrical power, and may be provided by air blower due to air compression. Alternatively, the incoming air can be heated by means of a standard heating system, e.g. using a heat exchanger.

In accordance with the present invention, a method for wastewater treatment is provided. The method involves: placing at least one porous microbial support within a reactor such that the supplied wastewater must pass through the at least one porous microbial support to exit; supplying a wastewater at an inlet of the reactor; supplying oxygen into the reactor, so that the concentration of oxygen is between 0.05 and 0.35 mg/L averaged over the tank volume in an operating interval of 12 min. or less, to permit a consortium of microbes to define a biofilm on the at least one porous microbial support, the biofilm comprising anaerobic methanogenic microbes covered, and protected from oxygen, by a layer of aerobic methanotrophs and heterotrophs. The methanotrophs catabolize methane produced by the methanogenic microbes and oxygen from the supply, to provide heat within the film for the growth of the film and decomposition of organics within the wastewater.

The placement of the at least one porous microbial support may define, in the reactor, at least one sludge and/or scum collection region. The placement may involve placing two porous microbial supports in parallel or series, in which case the oxygen may be supplied adjacent to at least one of the two porous microbial supports.

The two porous microbial supports may be conductive, and a power supply provided between them may define anodic and cathodic microbial supports, forming a microbial electrolysis cell. The method may further involve supplying up to 10 A at 0.5-1.5 V between the anodic and cathodic microbial supports. The supplied electricity may be intermittent, having a period of less than 20 min. and a duty cycle of at least 10%. The method may further involve operating the microbial electrolysis cell so that the biofilm naturally formed exhibits bioelectrochemical activity. A biofilm on the anodic microbial support may include a layer of anodophilic bacteria closest the support.

A wastewater treatment control processor may be provided to monitor a parameter of the wastewater by coupling to the power supply.

Supplying oxygen into the reactor may involve operating an air injector for microbubble aeration.

The wastewater is preferably drawn through the reactor by gravity alone.

Also, in accordance with the present invention, two flow-through wastewater treatment reactors are provided. The first reactor comprises: a reactor tank having an inlet for wastewater, an outlet for treated water, and intermediate the inlet and outlet, at least one porous microbial support through which the wastewater must pass to go from the inlet to the outlet; an air injector for introducing oxygen into the reactor tank to microaerate the wastewater, so that the concentration of oxygen is between 0.05 and 0.35 mg/L averaged over the tank volume in an operating interval of 12 min. or less; and a biofilm formed on the microbial support comprising a population of anaerobic microbes for digesting organics in the wastewater including methanogenic microbes, and an aerobic methanotrophic and heterotrophic population that catabolizes methane from the methanogenic microbes, and oxygen from the injector, to produce heat.

The second reactor comprises: a reactor tank having an inlet for wastewater, an outlet for treated water, and intermediate the inlet and outlet, at least one porous microbial support through which the wastewater must pass to go from the inlet to the outlet, the at least one porous microbial support including at least two conductive porous microbial supports coupled to a power supply to produce anodic and cathodic supports; an air injector for introducing oxygen into the reactor tank to microaerate the wastewater, so that the concentration of oxygen is between 0.05 and 0.35 mg/L averaged over the tank volume in an operating interval of 12 min. or less; and a biofilm formed on the microbial support comprising: a population of anodophilic microbes; covered by anaerobic microbes for digesting organics in the wastewater, the anaerobic microbes including methanogenic microbes; and an aerobic methanotrophic and heterotrophic population that catabolizes methane from the methanogenic microbes, and oxygen from the injector.

For either reactor, the porous supports may be a part of a cartridge insertable in the tank in a slot thereof. If the reactor comprises a power supply coupled to two of the at least one porous supports, the two porous supports are conductive, and separated by an insulator, the power supply may be adapted to supply electrical power to the porous supports to produce anodic and cathodic microbial supports. If so, the biofilm further comprises an anodophilic microorganism layer intimate with the conductive porous supports that underlies the methanogenic microbes.

If the at least one porous microbial support includes two porous supports, they may be arranged in parallel or series. At least one sludge and/or scum collection region spatially separated from the at least one porous microbial support may be provided. The air injector may be located proximate at least one of the two porous supports.

The power may be adapted to supply at 0.5-1.5 V at 0 to 10 A between the anodic and cathodic microbial supports. The supplied electricity may be intermittent, having a period of less than 20 min. and a duty cycle of at least 10%.

The reactor may further comprise a vent for collecting biogas from the reactor; or a spent sludge trap for collecting inert solids. Solid sulphur may be precipitated from a first of the at least one porous supports, the first porous support supporting a biofilm with H2S oxidizing aerobic heterotrophic microbes. The biofilm may further comprise a population of ammonium nitrifying aerobic and/or anodophilic microbes, and the energy demand is reduced by nitrification of ammonium.

The reactor may further comprise a wastewater treatment control processor adapted to monitor a parameter of the wastewater by determining one of power, current, resistance, or voltage of a lead of the power supply.

Wastewater may be drawn through the reactor by gravity alone.

The injector may be a part of a cartridge supporting one or more of the at least one porous microbial support, the injector adapted to supply volumes of the air so that an aeration to wastewater flow ratio of 3.5 to 14 (L/L) is maintained. The injector may comprise a preheater for delivering warmed air to the porous support.

The biofilm may be less than 1 mm thick and bioelectrochemical decomposition at the electrodes may be performed, by: oxidation of organics at the anode; production of H2 at the cathode; production of CH4 at the anode or cathode; and/or and CH4 oxidation by the aerobic methanotrophic and heterotrophic population.

Finally, a biofilm for wastewater treatment on a porous microbial support is provided. The biofilm includes anaerobic microbes for digesting organics in the wastewater including methanogenic microbes; and an aerobic methanotrophic and heterotrophic population that covers, and protects from oxygen, the anaerobic microbes, and catabolizes methane from the methanogenic microbes. A composition of the biofilm is consistent with growth in an environment with a concentration of oxygen between 0.05 and 0.35 mg/L. The biofilm may further comprise a population of anodophilic microbes in a layer closest the support.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which:

FIGS. 1A,B are schematic illustrations respectively of top plan and side elevation views of a wastewater treatment system (WWTS) in accordance with a first embodiment;

FIG. 2 is a schematic illustration of a variant of the first embodiment having a plurality of porous media support compartments, including a scum collecting compartment;

FIG. 3 is a schematic illustration of a variant of the first embodiment showing porous media support compartments: with microaeration; with microaeration and coupled electrodes to form a MEC; and without microaeration coupled electrodes to form a MEC;

DESCRIPTION OF PREFERRED EMBODIMENTS

Figures 1A, 1B, 2, 3:
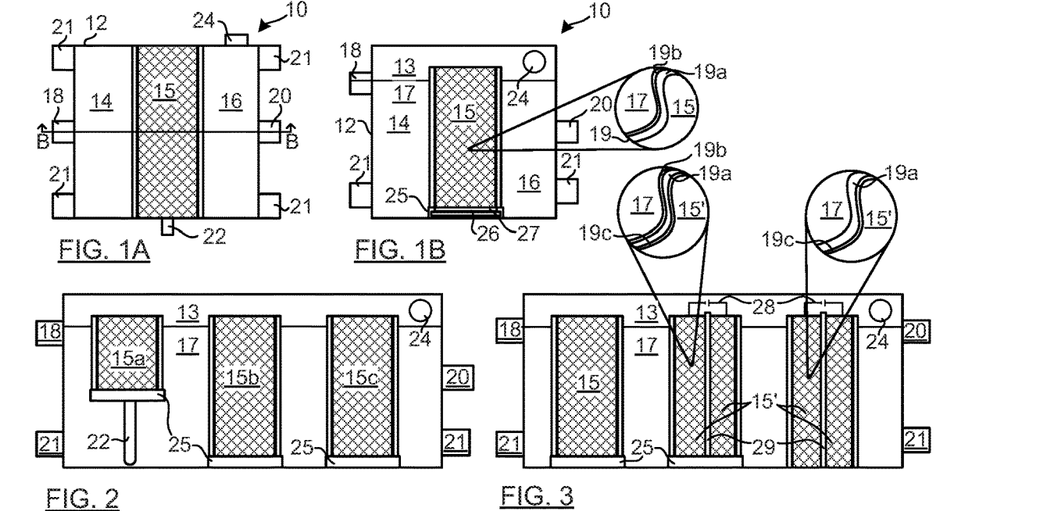

FIGS. 1A,B schematically illustrate a first embodiment of a wastewater treatment WWTS 10 in use, in accordance with a first embodiment of the present invention, respectively showing a top plan, and side elevation views with respective outer walls removed. The WWTS 10 is defined as a single reactor chamber 12 that is partitioned into 3 areas, at least below a fill line separating an air gap 13 from a wastewater treatment level; the 3 areas including a porous media support compartment 15 shown filled with a porous media that defines a very high surface area solid scaffold for biofilm support, and preliminary and tertiary compartments 14,16. The preliminary compartment 14 typically has two principal collection zones: a scum collection region near the interface between air gap 13 and wastewater 17 for collecting froth and buoyant particles; and a preliminary sludge collection region for accreting solid particulate material. Tertiary compartment 16 does not typically accumulate much buoyant particulate material, but does typically accumulate sludge. While the compartments 14-16 are schematically illustrated as equal volume compartments, it will be appreciated that the porous media support compartment 15 may be substantially larger than the other two, and further that a design of the compartments may be substantially different. For example, the outer wall of the reactor chamber 12 may be curved to minimize a space in preliminary compartment 14 for the wastewater 17, away from the scum and sludge regions, respectively. Likewise the tertiary compartment 16 may take up less volume than the porous media support 15, and may provide modest space for the outlet 20, and spent sludge collection 21. Any one of the compartments 14-16 may be provided by a removable cartridge for modular replacement. The porous media support 15 may be supplied in a wire basket or like porous mesh or container that retains the porous media support 15 in position to occupy the requisite volume, such that every path from the inlet 18 to the outlet 20 passes through some part of the porous media support 15.

Figures 4, 5:
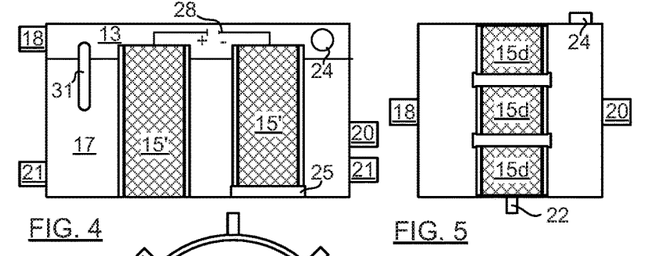
FIG. 4 is a schematic illustration of a variant of the first embodiment showing two conductive porous media support compartments coupled to a power supply to define a MEC, with an anode compartment thereof having microaeration, and a scum collector.
FIG. 5 is a schematic illustration of a variant of the first embodiment showing a parallel arrangement of porous media support compartments.

An inlet 18 for the WWTS 10 is provided for the supply of the wastewater 17 to a level below the fill line, and an outlet 20 is provided for removal of the treated water. The water may advantageously be sufficiently clean to pass standards for release into a water supply, into a lagoon, or into another treatment system. As is conventional, the inlet 18 allows for a gravitationally separated flow of solids liquids and gasses, and the interface between solids and gas may align with the fill line as shown. Alternatively, the inlet 18 can be strictly above the fill line, as shown in FIG. 4 variant, although in such embodiments it may be preferred to provide a flow distributor for improving consistency of particulate loading throughout a liquid phase 17.

The outlet 20 may be of any form known in the art. It is noted that conventionally some attention is paid to ensuring that the outlet 20 draws none of the sludge collected in the clarifying region. As such spatial separation of a sludge collection region and the outlet 20, and mechanical filtration means are typically used. Furthermore, controlled depth of draw may be provided by straw structures, buoyant elements, and anchors to compensate for variation in fill volumes in use.

An injector port 22 is provided in communication with the porous media support compartment 15, to inject a controlled supply of oxygen to the porous media support 15. The oxygen supply is reasonably limited to supplying air, although the air could be any oxygen rich air pollution, and may in part be processed by bubbling through the porous media support 15. The air gap 13 will naturally accumulate biogas in operation. A biogas port 24 may be provided for venting biogas, which may be collected in sufficient quantity to make harvesting cost effective.

FIG. 1B shows a cross-sectional view of a controlled oxygen supply system 25 with a plenum 26 in communication with the injector port 22 (possibly via a check valve for ensuring one-way flow, and a solenoid valve for electronic control over the oxygen delivery rate). The gas in the plenum 27 percolates through a distributor 27 which is in contact with the porous media support 15. The percolating gas is therefore introduced into pores of the media support 15 as bubbles or microbubbles. There are several means available for diffusing oxygen or air bubbles into a porous medium known in the art.

The first embodiment also features 4 sludge ports 21, two in communication with preliminary compartment 14, and two with tertiary compartment 16. An elevation of the sludge ports 21 may be selected to automatically remove excess or spent sludge once the sediment exceeds a certain level. It will be appreciated that the principal way to grow a biofilm involves subjecting the porous media support 15 to wastewater with a certain period with a minimal amount of sludge for a prolonged period, prior to flow through treatment. However, depending on a WWTS's 10 efficiency of COD removal, sludge will typically accrete beyond the decomposition rate, and sludge ports 21 may be useful for removing this before too much of the chamber 12 is replete with sludge. That said, Applicant has found a surprisingly high level of COD removal, specifically with the combination of the electrode-based porous media support 15 and microaeration regimes combined in a single reactor 12.

The operative feature of the WWTS 10 is a biofilm 19 supported by the porous media support 15, interfacing the wastewater 17, as shown enlarged in FIG. 1B. The biofilm 19 is generally a gas-permeable membrane composed of microbes (bacteria, archaea, fungi) extracellular polymeric substances, and floc. Typical mature biofilms have a thickness ranging from about 0.1-1 um.

In the embodiment of FIG. 1A,B, a single porous media support 15 is provided, and the film includes at least an anaerobic methanogenic microbial film 19a covered, and protected from oxygen, by a layer of aerobic methanotrophs and heterotrophs 19b. The methanogenic microbes, or methanogens of 19a, and other anaerobic microbes are responsible for COD decomposition and the production of methane (via acetate). The methane is shared with the aerobic layer of methanotrophs and heterotrophs 19b. A thickness of the aerobic layer 19b is dictated by oxygen infiltration. It will be appreciated that oxygen availability decreases with depth in the biofilm 19, and the methanotrophs and heterotrophs are expected to be substantially confined to within about 20-30 um of the biofilm 19. It will be also appreciated that COD permeates the aerobic layer 19b with little resistance, as does methane. As a result, the methanogens of 19a are supplied organic materials to be removed from the wastewater 17 (COD), and produce methane, while the methanotrophs and heterotrophs scavenge the oxygen, and catabolize the oxygen with the methane. As far as heat is concerned, the catabolization of oxygen and methane provides in-film heating to support the anaerobic 19b and aerobic 19a layers of the biofilm 19. Additional COD removal by heterotrophs of the aerobic layer 19b, and additional heat generated therefrom may be substantial.

Figure 6:
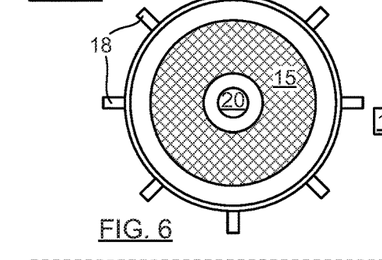
FIG. 6 is a schematic illustration of a variant of the first embodiment with a cylindrical multi-inlet WWTS.
Figure 7:
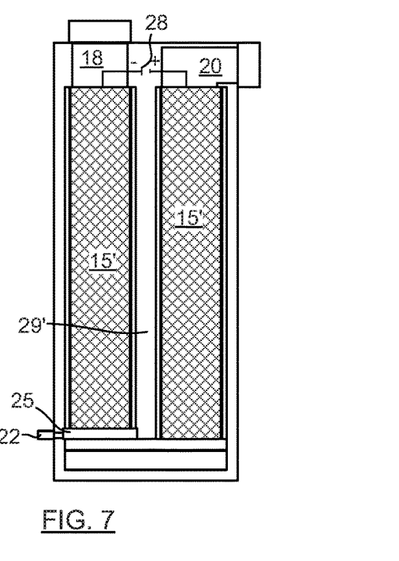
FIG. 7 is a schematic illustration of a variant of the first embodiment with a columnar bioelectrochemical WWTS.
Figure 8:
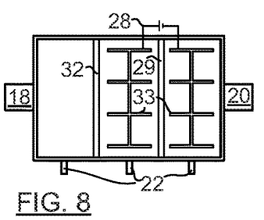
FIG. 8 is a schematic illustration of a variant of the first embodiment with anode and cathode compartments and a porous media support with charge distributors.

Each of FIGS. 2-8 schematically illustrates a respective variant of the embodiment of FIG. 1. FIGS. 5,6,8 are shown in top plan view, whereas the remainder are in side elevation view. Herein features of variants identified by like reference numerals are associated with like feature of the embodiment, and their descriptions are not repeated herein except to note variances.

FIG. 2 schematically illustrates a variant of the embodiment of FIGS. 1A,B in which second and third porous media support compartments 15a,b,c are provided. This results in three regions in which particulate matter falls to sludge: a preliminary sludge collection region beneath extending from the inlet 18 to porous media support compartments 15b; between porous media support compartments 15b and 15c; and between porous media support compartments 15c and the outlet 20; the second of these having regions similar to the last.

Porous media support compartment 15a is shown of a different dimension. While every path from the inlet 18 to outlet 20 must pass through porous media support, all such paths need not pass through all porous media support compartments. Compartment 15a is shown operative to define a scum collection barrier, and also shows injector port 22 supply tube for the controlled oxygen supply system 25: the injector port 22 supply tube would occupy a negligible volume of the compartment and would not prevent flow of the wastewater 17 under the compartment 15a. In an alternative embodiment what is identified as the injector port 22 supply tube could be a flow obstruction that precludes flow below the compartment 15a except possibly within the sludge.

The variant shown in FIG. 3 shows a 3 porous media support compartment 15 WWTS with a first of which being substantially identical to that of the embodiment of FIGS. 1A,B, and two porous media support compartments 15' in which the porous media support are electrically conductive media. While a very large variety of materials can be used, in principal ranging from porous metal foams to packings of metal, or conductive ceramic particles, foams of highly conductive polymers, especially those laden with conductive powders, and folded perforated sheet structures.

It will be noted that each of the two conductive support compartments 15' is divided into two chambers, that are mutually separated by a high impedance porous dielectric 29, permitting the definition of both anode and cathode chambers. A power supply 28 is connected to each conductive porous media support chamber to produce a cell therefrom. Either of the two supports 15', with their porous dielectric and power supply makes the WWTS formally a microbial electrolysis cell. By supply of electrical current thereto, anodophilic and cathodophilic microbes are encouraged to proliferate in a neighbourhood of the support 15'. Surprisingly Applicant has found that a separation of the chambers by more than a thin (less than 2 mm) high impedance porous dielectric 29 is not required, and not particularly advantageous. Also surprisingly, energy conservation by intermittent application of the current supply has produced substantially equal COD degradation, and thus intermittent current supply is a preferred power supply 28. Specifically the period for the power supply 28 is preferable less than 20 min., more preferably less than 15, 12, 10, 8, 5, 3, 2, or 1 minute, and is preferably more than a few microseconds. A duty cycle is preferably between 10 and 95%, more preferably from 50 to 80%. A voltage of the power supply 28 is below the effective electrolysis limit of 1.6-1.8 V, preferably between 0.8 and 1.5 V, more preferably from 1.2 to 1.4 V.

The biofilm 19 naturally produced on the conductive support compartment 15' without microaeration is shown in the enlargement (right) to basically include the anaerobic layers 19a and further comprise the anodophilic layer 19c that is in contact with the conductive support 15'. The advantages of anodophilic bacteria in conjunction with microaeration do not have to be provided on a same biofilm of a reactor to achieve the advantages of increased COD decomposition, and lower temperature operation. While anodophilic bacteria have been shown to improve bioelectrochemical decomposition, at least some pollutants of wastewater are likely to be ameliorated by cathodophilic microbial activity, with or without microaeration.

The variant of FIG. 4 shows separated anode and cathode conductive support 15' compartments, only the anode of which being subject to microaeration. As previously indicated, the inlet 18 is shifted above the fill line for dropped influx. A non-porous scum collector 31 is used to direct the wastewater, increase homogenization of the particle loading, break up larger particles, and/or accelerate separation of volatiles from froth.

FIG. 5 is a variant showing a plurality of porous media support compartments 15d that are ganged in parallel to produce a barrier between the inlet 18 and outlet 20. While the compartments 15d are shown as not necessarily conductive, and not coupled to a power supply, in an alternative embodiment they are, and separated by a possibly porous and possibly non-porous dielectric. An advantage of the series chamber cell architectures (e.g. FIGS. 3,4,7,8) is that wastewater treatment by both anodic and cathodic chambers are assured, whereas in a parallel chamber cell architecture proposed 5 as this alternative, wastewater may be treated by either anodic or cathodic chambers. An advantage of the parallel arrangement is that the dielectric need not be porous.

FIG. 6 is a schematic illustration of a variant of cylindrical design, which may be preferred when a fixed piping arrangement is provided from a plurality of wastewater sources. FIG. 6 shows 8 inlets 18 circumscribing an outer cylindrical wall of the reactor chamber. A scum collector region and preliminary sludge compartment are provided before the porous media support 15, which takes up a bulk of the volume of the reactor chamber. While the porous media support 15 is illustrated as a single annular cylindrical body, it may be practical to divide this into a plurality of cartridges of any convenient shape and size. The porous media support 15 may alternatively be conductive and part of one or more cells. A central outlet 20 is provided via a straw structure that ensures the outlet 20 does not withdraw sludge.

FIG. 7 shows a variant with a columnar flow through design. The wastewater 17 is introduced via top opening 18 from which an only path leads through an anodic conductive porous media support 15' that is coupled with a controlled oxygen supply system 25 for bubbling gas to provide microaerobic conditions in the anodic support 15'. Note that the wastewater passes through the supply system 25, and the plenum is preferably provided as an array of fine tubes around which the wastewater flows.

A sludge trap is provided underneath the supply system 25 which also provides for communication of the wastewater between the anodic and cathodic supports 15'. While the cathodic support 15' is shown without a respective controlled oxygen supply system 25, in another embodiment a second supply system 25 is provided for the cathodic support 15', or a unified supply system 25 is provided around or under the sludge trap. The wastewater, after rising through the cathodic support 15' exits via the outlet 20 as treated water. In this embodiment the dielectric 29 between the supports 15' are non-porous such that the only fluid path from the inlet 18 to outlet 20 passes through the full length of both supports 15'.

FIG. 8 is a (possibly portable) WWTS consisting of a container partitioned by porous dielectric walls 32, into 3 compartments. Each of the compartments is intended to be filled with a porous media support, but the first compartment may be non-conductive, as aeration is provided for each of the 3 compartments. In alternative embodiments spacing may be provided around compartments for sludge traps, and fewer or more compartments may be provided. The second and third compartments include electrical distributors 33 for enhancing contact with conductive porous media support (not shown for ease of illustration), for reliable contact with respective electrodes of the power supply.

Figure 9:
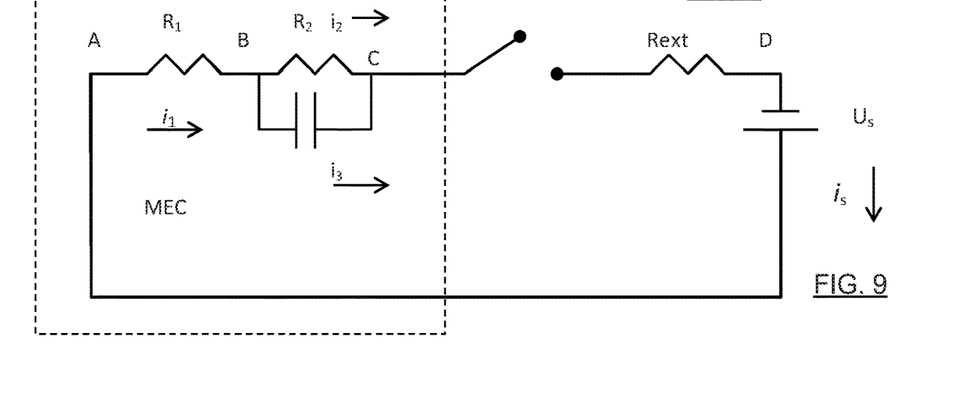
FIG. 9 is a schematic illustration of an equivalent electric circuit for use in modeling a bioelectrochemical WWTS.

FIG. 9 is a schematic illustration of an equivalent electrical circuit model for real-time monitoring of reactor performance. As visual inspection of WWTSs is undesirable, especially in cold climates where these are preferably buried for improved insulation, and as detection of treated water contamination outside of standards are somewhat too late to remediate, it is highly advantageous, apart from the surprisingly improved COD removal rates offered by combining bioelectrochemical microbial activity with aerobic microbial activity for in-film heating, to monitor the COD density at the electrodes using the same power supply. Doing so calls for a minor investment in electronics for measuring current at a few positions in the power supply, providing some memory for storage, and possibly logging data, and also control processes to vary the power supply, or alert operators of a spike in COD density, for example.

A publication entitled REAL-TIME MONITORING 1 OF A MICROBIAL ELECTROLYSIS CELL USING AN ELECTRICAL EQUIVALENT CIRCUIT MODEL that is currently accepted but pending by the Applicant teaches how internal capacitance and resistance can be estimated, and shows that these two parameters as well as the current are correlated with COD concentration. The content of this reference is incorporated herein by reference.

EXAMPLES

The present invention has been demonstrated using a design shown in FIG. 8. The reactor contained a microbial support compartment, a cathode compartment and an anode compartment. Non-conductive perforated dividers 32 were used for compartment separation. The cathode and anode compartments were filled with granular activated carbon (15'), which is electrically conductive. The microbial support compartment contained biorings made of a non-conductive plastic material (15). Stainless steel mesh was inserted in each electrode compartment and used as current distributors 33. The reactor had a 20 L capacity without the microbial supports or distributes, and 15 L liquid volume in use. The reactors were operated at an applied voltage of 1.4 V DC. The voltage was maintained using a power supply PW18-1.8AQ (Kenwood Corp, Tokyo, Japan). Air spargers (25) were installed at the bottom of the microbial support and anode compartments as shown in FIG. 1 (in this test, the cathode compartment micro-aeration was not activated). Air supply was provided by a peristaltic pump (Masterflex Model 7551-20, Cole Parmer, USA).

The reactors were inoculated with 2 L of waste activated sludge (Ste-Catherine wastewater treatment plant, QC, Canada) containing 18-20 g $L^{-1}$ total suspended solids. Experiments were carried out in 6 phases as outlined in Table 1. All tests were conducted at room temperature of approximately 23° C.

TABLE 1

Experimental results: Reactors were operated at an Hydraulic Retention Time (HRT) of 2.1 day and influent COD concentration of 1200-1400 mg/L. Compartments were micro-aerated at an air flow rate of 20 L/day, as compared to an influent flow rate of 7.5 L/day.

| Operational conditions | Biorings | | electrodes | | Effluent |
|---|---|---|---|---|---|
| Phase/Reactor | aeration | COD mg/L | Voltage V | anode aeration | current mA | COD mg/L |
| 1/1 | No | 990 | 1.4 | No | 40 | 370-420 |
| 2/1 | No | 600 | 1.4 | Yes | 20 | 150-194 |
| 3/1 | No | 940 | 0 | No | 0 | 450-550 |
| 4/2 | Yes | 660 | 1.4 | Yes | 15 | 90-140 |

Results shown in Table 1 demonstrate the effect of bioelectrochemical conditions and micro-aeration on COD degradation. In the absence of electrical current and micro-aeration, the effluent COD concentration was as high as 450 to 550 mg/L. Under bioelectrochemical conditions (current of 40 mA) the CODs decreased to below 420 mg/L. Application of microaeration at the last (anode) compartment reduced the effluent concentration to below 200 mg/L. Finally, by aerating both the microbial support (biorings) and the anode compartment the effluent CODs were decreased to less than 150 mg/L. $BOD_5$ measurements showed a value of 15 mg/L in phase 4/2 (140 mg/L COD).

A second set of experiments were performed to assess use of intermittent power supply on COD decomposition rates. It was found that intermittent supply with a voltage of 1.4 V, a period of 5 s. and a duty cycle of 95%, led to a factor of 2 reduction in COD effluent concentration.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A method for wastewater treatment comprising:
   providing a reactor having at least two porous microbial supports that are conductive in parallel or series such that a wastewater must pass through the at least two porous microbial supports to exit;
   supplying the wastewater at an inlet of the reactor;
   supplying oxygen into the reactor to permit a consortium of microbes to define a biofilm on the at least two porous microbial supports, the biofilm comprising anaerobic electroactive and methanogenic microbes covered, and protected from oxygen, by a layer of aerobic methanotrophs and heterotrophs; and
   supplying up to 10 A at 0.5-1.5 V power with at least one power supply to the at least two porous microbial supports to define an anodic and a cathodic microbial support, forming a microbial electrolysis cell,
   wherein the methanotrophs catabolize methane produced by the methanogenic microbes and the oxygen supplied, to provide heat within the biofilm for the growth of the biofilm and decomposition of organics within the wastewater, and
   wherein supplying oxygen into the reactor includes supplying oxygen to both the anodic and the cathodic microbial supports.

2. The method of claim 1 wherein the at least two porous microbial supports define in the reactor at least one sludge and/or scum collection region.

3. The method of claim 1 wherein the oxygen is supplied adjacent or directly to at least one of the at least two porous microbial supports.

4. The method of claim 3 wherein the oxygen is supplied so that the concentration of oxygen in the wastewater is between 0.05 and 0.35 mg/L averaged over the wastewater volume in the reactor in an operating interval of 12 min. or less.

5. The method of claim 4 wherein the supplied power is intermittent, having a period of less than 20 min. and a duty cycle of at least 10%.

6. The method of claim 3 wherein the microbial electrolysis cell is operated such that the biofilm naturally formed exhibits bioelectrochemical activity.

7. The method of claim 4 wherein a wastewater treatment control processor is adapted to monitor a parameter of the wastewater by coupling to the at least one power supply.

8. The method of claim 2 wherein the at least two porous microbial supports are substantially larger than the at least one sludge and/or scum collection region.

9. A flow-through wastewater treatment reactor comprising:
   a reactor having an inlet for wastewater, an outlet for treated water, and intermediate the inlet and outlet, at least two porous microbial supports that are conductive through which the wastewater must pass to go from the inlet to the outlet;
   an air injector for introducing oxygen into the reactor to microaerate the wastewater; and
   at least one power supply coupled to two of the at least two porous microbial supports, wherein the at least two porous microbial supports are separated from each other by a porous insulator defining at least one anode and at least one cathode, the at least one power supply adapted to supply power to the at least two porous microbial supports of up to 10 A at 0.5-1.5 V such that a microbial electrolysis cell is formed, whereby biofilms formed on the at least two porous microbial supports comprise: a population of anaerobic microbes for digesting organics in the wastewater, including methanogenic microbes, and an aerobic methanotrophic and heterotrophic population that catabolizes methane from the methanogenic microbes and organic matter, respectively, and oxygen from the injector and an anodophilic microorganism layer intimate with the at least one anode, underlying the methanogenic microbes.

10. The reactor of claim 9 wherein one of the at least two porous microbial supports is a part of a cartridge insertable in the reactor in a slot thereof.

11. The reactor of claim 9 wherein two of the at least two porous microbial supports are arranged in parallel or series, and the air injector is located proximate or inside at least one of the at least two porous microbial supports.

12. The reactor of claim 9 wherein the air injector is adapted to supply air at a rate that maintains a concentration of oxygen in the wastewater between 0.05 and 0.35 mg/L averaged over the wastewater volume in the reactor in an operating interval of 12 min. or less.

13. The reactor of claim 9 wherein the supplied electrical power is intermittent, having a period of less than 20 min. and a duty cycle of at least 10%.

14. The reactor of claim 9 further comprising: a vent for collecting biogas from the reactor; at least one sludge and/or scum collection region spatially separated from the at least two porous microbial support; or a spent sludge trap for collecting inert solids.

15. The reactor of claim 9 wherein the biofilms further comprise: $H_2S$ oxidizing aerobic heterotrophic microbes; or a population of ammonium nitrifying aerobic and/or anodophilic and cathodophilic microbes.

16. The reactor of claim 12 further comprising a wastewater treatment control processor adapted to monitor a parameter of the wastewater by determining one of power, current, resistance, or voltage of a lead of the at least one power supply.

17. The reactor of claim 9 wherein wastewater is drawn through the reactor by gravity alone.

18. The reactor of claim 10 wherein the injector is a part of the cartridge, the air injector adapted to supply volumes of the air so that an aeration to wastewater flow ratio of 3.5 to 14 (UL) is maintained.

19. The reactor of claim 9 wherein the biofilms at the at least two porous microbial supports are less than 1 mm thick and are adapted for bioelectrochemical decomposition involving: oxidation of organics at the at least one anode, production of $H_2$ at the electrode that is cathodic, and/or production of $CH_4$; and/or $CH_4$ oxidation by the aerobic methanotrophic and heterotrophic populations.

* * * * *